Figures 1, 2:
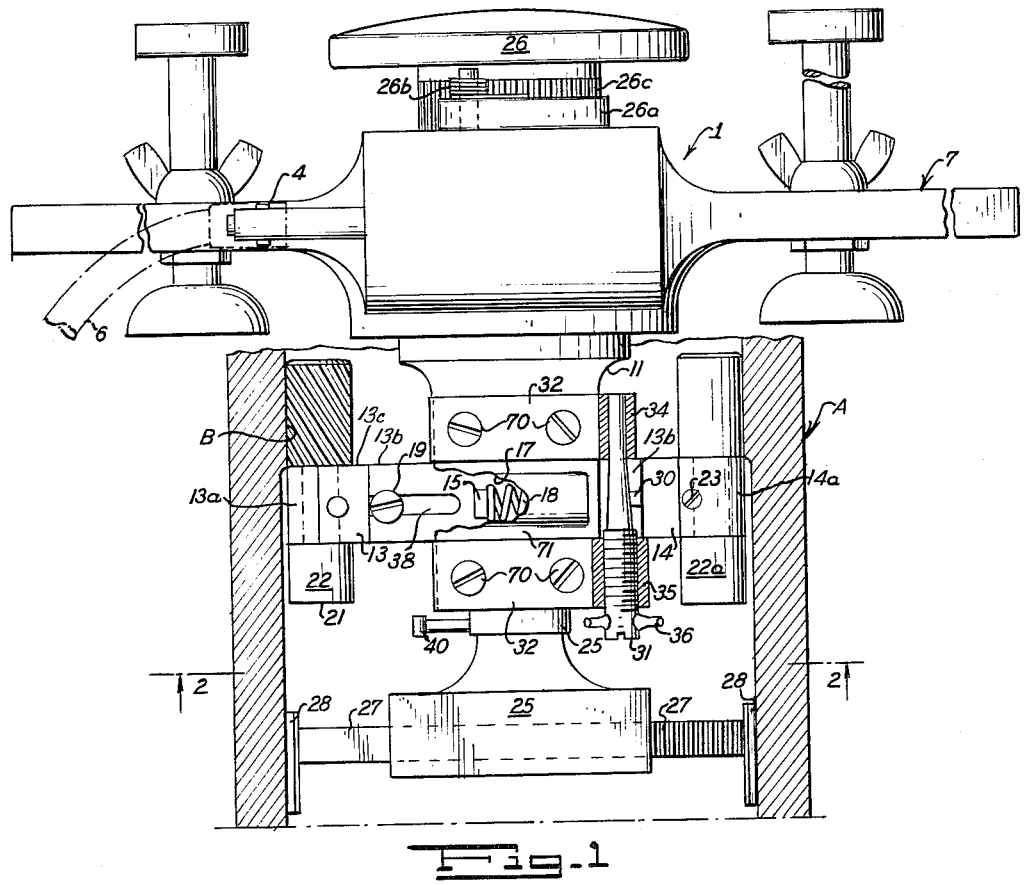

Nov. 23, 1965 C. C. RENFROE 3,218,762
POWER DRIVEN RIDGE REAMER
Filed Aug. 31, 1964

INVENTOR
CHARLES C. RENFROE

BY Mason, Mason & Albright
ATTORNEYS

United States Patent Office 3,218,762
Patented Nov. 23, 1965

3,218,762
POWER DRIVEN RIDGE REAMER
Charles C. Renfroe, 323 E. Pershing Ave.,
Tallahassee, Fla.
Filed Aug. 31, 1964, Ser. No. 393,073
6 Claims. (Cl. 51—245)

This is a continuation-in-part of application Serial No. 151,022, filed Nov. 8, 1961, now Patent No. 3,146,562.

The invention relates to a machine for removing the ridge which forms after much use on the inside cylinder walls of a pump or internal combustion engine cylinder caused by the piston rings wearing the cylinder walls. In particular, the invention relates to a feed limiting attachment incorporated on such a machine whereby the expansion of the reamers against the cylinder walls are retarded in a regular predetermined manner and the amount of material of the cylindrical wall which is removed in each revolution of the reamer is regulated. This application is for an improvement on the Power Driven Ridge Reamer covered by my Patent No. 3,146,562.

The object of the invention is thus to provide an improved power-driven tool for the removal of the ridge from the top of the interior cylindrical wall of a reciprocating machine caused by piston ring wear and to otherwise "true up" the cylindrical walls wherein the degree of engagement by reamers against the walls is regulated and power required to operate the machine does not normally exceed that supplied.

Other objects, adaptabilities, and capacities will appear as the description progresses, reference being had to the accompanying drawings in which:

FIGURE 1 is an elevational view illustrating the feed limitation attachment partially in section and broken away for purposes of clarity; and FIGURE 2 is a sectional view taken on line 2—2 of FIGURE 1.

It is well known in the art that piston rings after considerable use cause a ridge to be formed on the inner cylindrical walls due to the wearing of the rings against such walls. The same is also true of pumps and other reciprocating types of devices which include cylinders and pistons. This ridge usually extends from the top of the piston ring travel area in the cylinder upward to the top of the cylinder block. The ridge must be cut away so as to be flush with the cylinder wall at the time of an engine overhaul or piston ring replacement so as to prevent damage to the pistons when removed from the engine cylinders and also to prevent damage to new piston rings and possibly the pistons as well after replacement. Also, severe knocking of the engine may be caused by the top of the uppermost piston ring striking the bottom of the ridge where the same has not been removed or has been partially or improperly removed.

Previous types of ridge removing devices have proved inadequate. Hand operated tools in use have been both time and energy consuming. Moreover, it has been found necessary to use them in confined working spaces in the engine compartment. Because of this, previous hand operated ridge reamers were turned by means of a socket wrench and handle attached to the tool with power being applied to one side of the tool. When use was in confined areas where it was impossible to use both hands to steady the tool, tilting often occurred with either damage to the cylinder wall or an incomplete cutting job. Such disadvantages were largely cured by the power driven ridge reamer disclosed in my Patent No. 3,146,562. Such tool is operated by an electric drill available in most motor repair shops, does not tilt, and removes the ridge handily and quickly. In addition, such machine is relatively inexpensive for its purpose. However, it has been found that the reamer on such machine will at times— particularly if not adjusted correctly—take too much of a bite and bind in the cylinder so that it has to be removed and readjusted. Moreover, the placing of the reamers in the cylinder is an inconvenience since both reamers have to be collapsed by hand against the spring tension urging them outward. This invention envisages the use of a single cutter together with a device which retards the expansion of the reamer in a regular manner so that the bite taken by the reamer on any given revolution will not be beyond the power of the motor driving the machine.

Referring now to the drawings, the letter A indicates a portion of the cylindrical walls of an engine or pump. The main body or housing of the device, generally referred to by reference numeral 1, has an adjustable framework 7, by means of which it may be mounted in a suitable manner on an engine or pump block. A power take-off 4 may be driven by a flexible shaft 6, the opposite end of which, not shown, is connected to a suitable source of power such as an electric motor.

The base of the machine is provided with an adjustable foot assembly which includes two feet 28 which may be adjusted inwardly or outwardly by means of racks 27 which engage a gear, not shown, in the lower body 25. Such gear is connected to the handle 26 which includes a pawl part 26a and a spring 26b so that by turning the handle 26 the feet 28 may be moved against the cylindrical wall in a manner well known to the art and locked in place by the pawl part 26a in a manner also well known in the mechanical arts by the urging of the pawl member 26a by the spring 26b against the ratchet wheel 26c. When feet 28 are so forced outward against the sides of a cylinder wall with the adjustable framework 7 mounted in a suitable manner on the engine or pump block, the machine is fixed centrally in the cylinder in line with the longitudinal axis thereof. The machine remains in such fixed position during the removal of the ridge B on the interior wall of the cylinder. As shown in FIGURE 1, between the upper main body 1 and the lower body 25 is the rotating tool holder or tool-supporting body 11. It will be understood that by gearing, not shown, the tool-supporting body 11 is rotated by means of the power take-off 4. The tool-supporting body 11 has a pair of horizontal recesses receiving two pairs of expandable tool support and tool backing bars 13 and 14. Each backing bar 13 and 14 is made of two parts and provided with slot 38 sliding on the bolts 19. At each ends of the bars 13 and 14 there are rotatably mounted tools 22 and 22a, respectively. Tool 22 comprises a cutter whereas tool 22a is a roller. The cutter 22 and the roller 22a rotate in bosses 13a and 14a, respectively, which are pivotally secured to the backing bars 13 and 14 by means of the shoulder bolts 23. The cutter 22 has a uniform cylindrical contour which is flush with the boss 13a so that when the ridge B is removed the smooth lower portion of the cutter, designated 21, will prevent the upper part from cutting beyond the ridge.

Each bar assembly 13 and 14 consists of a tool-supporting bar, 13c and 14c respectively, and a tool-backing bar, 13b and 14b respectively, and relative adjustment in locking in the adjusted position is accomplished by the bolt 19. Also, it will be appreciated from the drawings, the tool-backing bars 13b and 14b are held in the recesses within body 11 by means of a pair of covering plates 71 and bolts 70. The cover plates 71 are provided with a groove 17 for the reception of the cutter pressure springs 18. The spring 18 urges on one end against the end of the groove 17 and the other end against a lug 15 which extends normally from the backing bar 13b. Accordingly, it will be appreciated that both backing bars 13b and 14b are urged outwardly so that the cutter 22 and the roller 22a are both resiliently urged against the interior of the cylinder walls A. However, insofar as the tool-backing bar 13b is concerned, a further boss 30 bears against a tapered pin 31 to restrict the distance that the cutter 22 may expand against the side wall A due to the urging of the spring 18. The tapered pin 31 is carried by a pair of bars 32 which are secured in a parallel relationship by the bolts 70. A bearing 34 is formed at one end of the upper bar 32 and a threaded bushing 35 is disposed under and in axial alignment with bearing 34, the tapered pin 31 having its upper cylindrical portions slidably received in the bearing 34 and its threaded lower portion threadably received in the lower bushing 35. At the lower end of the tapered pin 31 is a slot wheel 36 which on each revolution of the tool body 11 engages a pin 40 extending from the normally stationary expansion unit body 25.

From the foregoing it will be appreciated that with each complete revolution of the tool body 11, the tapered pin 31 is backed down a small amount permitting the bar 13 to be urged further outwardly by the spring 18 due to the inward movement of the boss 30 against the tapered pin 31. Of course, when the ridge B has been removed, the cutter 22 will no longer cut inasmuch as the lower cylindrical portion 21 is riding on the inner cylindrical surface. In the event the operator should not turn the machine off, the tapered pin 31 will eventually be rotated by the pin 40 through the slot wheel 36 to a position wherein the slot wheel 36 is below the pin 40 and, accordingly, no further outward movement of the bar 13 will take place.

It will be appreciated that while we have included the cutter feed limiting attachment only on one side to regulate the cutter 22, a further similar regulator may be placed on the other side to limit the expansion of the bar 14 together with the roller 22a. It will also be appreciated that in such event, a cutter such as cutter 22 may be substituted for the roller 22a.

It will also be appreciated that the cutter may be of different grades in which case the coarser grade may have in the cutting portion a slightly reduced diameter as compared to the non-cutting portion.

The foregoing detailed description has been given for clearness of understanding only, and no unnecessary limitations should be understood therefrom, for modifications will be obvious to those skilled in the art.

Having thus described my invention, what I claim as new and desire to secure by Letters Patent of the United States is:

1. A machine for removing a ridge in cylinders comprising a cutter, means for mounting said cutter to rotate in machining engagement with the interior wall of a cylinder, said mounting means including resilient means urging said cutter into engagement with said wall, said mounting means including a pivotable support for said cutter for freely pivotally supporting same on a substantially horizontal axis when in a cutting position, said mounting means including automatic feed limiting means restricting the rate of radial feed of said cutter, and means for causing said cutter to rotate in a circular path about a center.

2. In a machine for machining interior walls of a cylinder which includes a rotatable cutting tool holder, a cutting tool, and a bar means extending from said holder carrying said cutting tool, a feed limiting device for said cutting tool which comprises resilient means urging said bar means and said cutting tool towards said walls, stop means incorporated in said bar means, a tapered part attached to said holder, said stop means urged by said resilient means against said tapered part, and means for moving said tapered part relative to said stop means by the rotation of said tool holder whereby said bar means is resiliently fed towards said walls at a predetermined rate.

3. In a machine for machining interior walls of a cylinder which includes a rotatable cutting tool holder, a cutting tool, and bar means extending from said holder carrying said cutting tool, a feed limiting device which comprises resilient means urging said bar means and said cutting tool towards said walls, stop means incorporated in said bar means, a tapered pin, a threaded part included in said pin, said threaded part threadably received by said holder, and means for screwing said threaded part in said holder to move said tapered pin relative to said stop means by the rotation of said tool holder, whereby said bar means is resiliently fed towards said walls at a predetermined rate.

4. In a machine for machining interior walls of a cylinder which includes a rotatable cutting tool holder, a cutting tool, and bar means extending from said holder carrying said cutting tool, a feed limiting device which comprises resilient means urging said bar means and said cutting tool towards said walls, stop means incorporated in said bar means, a tapered pin, a threaded part included on said pin, said threaded part threadably received by said holder, a projection extending from said machine, said holder moving relative to said projection, and a slot wheel extending from said tapered pin, said wheel engaging said projection and adapted to screw said threaded part in said holder to move said tapered pin relative to said stop means by the rotation of said tool holder whereby said bar means is fed towards said walls at a predetermined rate.

5. Structure in accordance with claim 4 wherein said projection disengages said wheel when said tapered pin is moved to a predetermined position.

6. Structure in accordance with claim 4 wherein said bar means includes a pivotable support for said cutting tool for freely pivotally supporting said cutter on an axis substantially perpendicular to the axis of said cylinder.

References Cited by the Examiner
UNITED STATES PATENTS

| 2,461,490 | 2/1941 | Berkman | 77—2 |
| 3,075,412 | 1/1963 | Kushmuk et al. | |
| 3,146,562 | 9/1964 | Renfroe | 51—241 |

ROBERT C. RIORDON, *Primary Examiner.*

LESTER M. SWINGLE, *Examiner.*